United States Patent [19]
Potter

[11] Patent Number: 5,443,208
[45] Date of Patent: Aug. 22, 1995

[54] CAB HEATER

[76] Inventor: Jay E. Potter, 5700 E. Robinson, Springdale, Ark. 72764

[21] Appl. No.: 247,852

[22] Filed: May 23, 1994

[51] Int. Cl.⁶ .............................................. B60H 1/02
[52] U.S. Cl. ............................................... 237/12.3 A
[58] Field of Search ........................ 237/12.3 A, 12.3 R

[56] References Cited

U.S. PATENT DOCUMENTS

| | | | |
|---|---|---|---|
| 797,533 | 8/1905 | Phillipps | 237/12.3 A |
| 1,294,438 | 2/1919 | Francisco | 237/12.3 A |
| 1,446,725 | 2/1923 | Schamberg | 237/12.3 A |
| 1,600,219 | 9/1926 | Eulberg | 237/12.3 A X |
| 1,775,702 | 9/1930 | Steindler | 237/12.3 A |
| 1,781,731 | 11/1930 | Noblitt | 237/12.3 A X |
| 1,936,776 | 11/1933 | Swain | 237/12.3 R X |
| 2,151,865 | 3/1939 | Nallinger | 237/12.3 A X |
| 2,584,329 | 2/1952 | Clapper | 180/54 |
| 2,920,829 | 1/1960 | Shane | 237/12.3 A |
| 3,155,318 | 11/1964 | Kirkham | 237/12.3 A |
| 4,093,119 | 6/1978 | Swisher | 237/12.3 A |
| 4,252,271 | 2/1981 | Green | 237/12.3 A |
| 4,612,975 | 9/1986 | Ikari | 165/43 |
| 4,615,483 | 10/1986 | Sheets | 237/12.3 A |
| 4,874,036 | 10/1989 | Masuda | 237/12.3 A X |

Primary Examiner—William E. Tapolcai
Attorney, Agent, or Firm—Richard C. Litman

[57] ABSTRACT

A conduit for heating the open cab of a tracked vehicle, such as a bulldozer, is formed by cutting a hole in the floor. Heated air flowing across the radiator then is propelled by the fan to pass between the two endless tracks, and enters the operator's compartment. Hinged doors are preferably placed over the opening, thereby covering the same when heating is not required. A filter is placed in the airflow to stop airborne dust. The novel arrangement requires vehicles having, in addition to the usual engine, radiator, and fan, an enclosed engine, including a fire wall or a dashboard panel, and an operator's compartment having a floor. The airway thus employed is protected by preexisting vehicle components, and relatively delicate external air deflectors and conduits prevalent in prior art devices are rendered unnecessary. The fan is adjusted to force air backwardly, for heating in the winter, and forwardly, for ventilating in the summer.

6 Claims, 3 Drawing Sheets

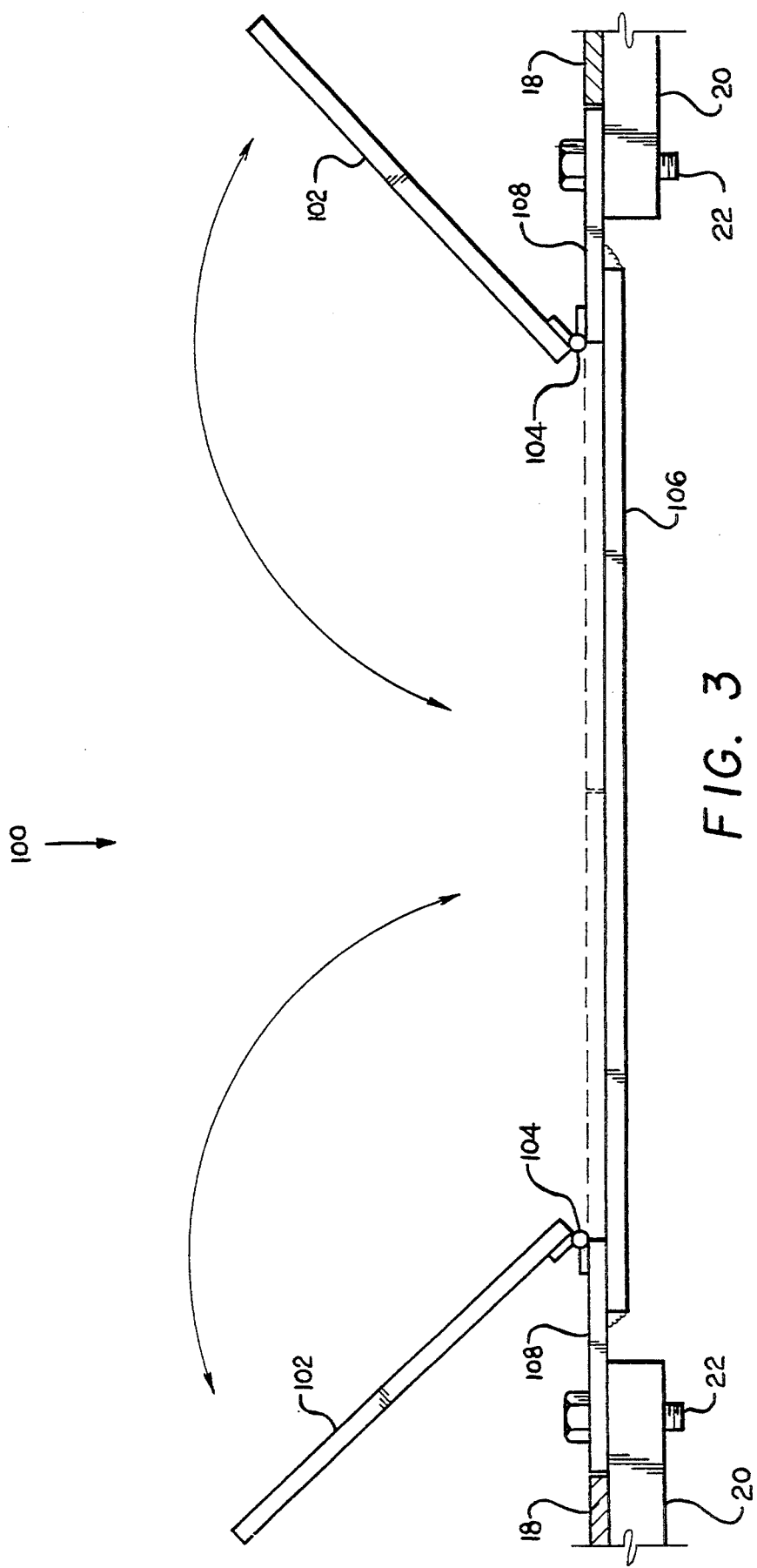

CAB HEATER

BACKGROUND OF THE INVENTION

1. FIELD OF THE INVENTION

The present invention relates to apparatus for heating the operator's compartment of a motor vehicle of the heavy, earth moving type with air heated by the vehicle radiator.

2. DESCRIPTION OF THE PRIOR ART

The problem of heating an open operator's compartment in heavy equipment vehicles has existed for some time, and numerous attempts to solve this problem have been proposed. One advantageous method exploits rejected heat from the radiator, and to conduct air heated thereby to the operator's compartment. The following patents illustrate this approach.

U.S. Pat. No. 1,446,725, issued to Herbert D. Shamberg on Feb. 27, 1923, discloses a heating system conducting heated air from the radiator at the front of the vehicle to the operator's compartment through a duct located within and against the hood of the vehicle. A second wall substantially parallel to the hood is provided just inside the hood. Heated air flows through the space therebetween. The air is forced by the engine fan.

U.S. Pat. Nos. 2,920,829 issued to Charles W. Shane on Jan. 12, 1960, and 3,155,318, issued to Arthur J. Kirkham on Nov. 3, 1964, disclose arrangements wherein a shroud is placed over the front of the radiator of an agricultural tractor. In each case, the shroud is for temporary use, made from fabric or flexible material. A conduit draws air from inside the shroud, and conducts this air to the operator's area of the tractor. The vehicle fan is arranged to discharge air to the front of the radiator, where it is collected by the shroud and conducted to the operator.

Permanent shrouds made from metal or other stout material are seen in U.S. Pat. Nos. 4,093,119, issued to Edmund Swisher on Jun. 6, 1978, and 4,252,271, issued to William R. Green on Feb. 24, 1981. The shroud of Swisher incorporates a filter for removing dust from the air, and has louvers selectively movable to adjust the amount of air directed back to the operator. A flexible conduit conducts heated air to a diffuser mounted in the operator's compartment.

U.S. Pat. No. 4,612,975, issued to Masanori Ikari on Sept. 23, 1986, discusses heating and cooling of an operator's compartment. Ikari provides an air duct located beneath the floor of the compartment for conducting air from a mixing chamber to individual blow ports, or air diffusers.

U.S. Pat. Nos. 2,584,329, issued to Clyde E. Clapper on Feb. 5, 1952, and U.S. Pat. No. 4,616,483, issued to Kerney T. Sheets on Oct. 7, 1986, disclose heating arrangements wherein air deflector panels are disposed about the engine compartment, for guiding warmed air towards the operator.

It should be noted that in all of the above references, an air flow path is disposed at the sides of or above the engine compartment and main bodywork of the respective vehicle. This flow path is defined by conduits provided for the purpose, or by auxiliary bodywork. Both types of structure are external to the vehicle, and subject to damage should the vehicle contact solid environmental objects, or tip over. These conduits and deflector plates may also obscure the operator's vision.

None of the above inventions and patents, taken either singly or in combination, is seen to describe the instant invention as claimed.

SUMMARY OF THE INVENTION

The present invention applies to heavy equipment having endless track or caterpillar tread, an enclosed engine including a firewall or solid dashboard panel, and an operator's compartment having a floor. The firewall or dashboard panel varies in precise configuration among different examples of such equipment, but generally functions to obstruct air flow from immediately around the engine into the operator's compartment. Likewise, the floor may have small openings and gaps, but effectively blocks communication between the spaces thereabove and therebelow. Thus, the firewall or dashboard, and the floor generally exclude moving air, dust, humidity, and temperature from the operator's compartment, with respect to the engine compartment and the space below the floor.

In vehicles of this type, which will be referred to hereinafter as tracked vehicles for brevity, an idle space exists behind the engine and between the tracks. Air flowing through the radiator flows through this space, passing beneath the compartment floor.

This situation holds true regardless of the direction of air flow. In most commercial vehicles of the type described above, the engine cooling fan has fan blades which are manually adjustable as to pitch. By manual adjustment, therefore, the direction of air flow can be controlled. Air can therefore flow from front to rear, passing first across the radiator, or can flow from the rear past the engine, then through the radiator, and be discharged forwardly.

According to the present invention, the solid and continuous floor is replaced by a floor having pivotally mounted doors. Normally, the doors are closed, and serve as a floor. When temperatures become extreme, and particularly in the cold, these doors are left open. The fan is adjusted to blow air from front to back. In the case of fans arranged for forward draft and having fixed blade fans, the blade assembly can be removed and reinstalled facing in the opposite direction. This will reverse the direction of air flow.

Air heated by the radiator and the engine will then be guided by bodywork to flow into the space between the idle space. Normally, when the doors are closed, this air is discharged to the rear of the vehicle. When the doors are opened, air pressure causes a significant portion of this warmed air to enter a zone immediately adjacent the operator. Thus, even in cases of equipment having open cabs, the operator's compartment becomes significantly heated to the point of enabling continuous work for long periods of time.

The same principles apply during hot weather. Although there is no active air conditioning per se, when the fan is adjusted to blow in the forward direction, a forwardly directed draft is induced. This air flow provides a measure of ventilation, prevents heated air from migrating in the direction of the operator from the idle space, and prevents heat build up at the floor and dashboard, as might otherwise occur from conduction of heat from the engine.

To accomplish the purposes of the invention, the vehicle floor proximate the operator is provided with hatches or doors. The vehicle can be manufactured in this manner, and preexisting vehicles not so manufactured are easily modified to incorporate the improvement.

Accordingly, it is a principal object of the invention to provide a tracked vehicle having an operator's compartment heating and ventilating system deriving heat rejected from the engine.

It is another object of the invention to locate an air flow path for a heating and ventilating system in a sheltered location within a tracked vehicle.

It is a further object of the invention to provide a heating and ventilating system by locating closures in the floor of a tracked vehicle.

Still another object of the invention is to protect a heating and ventilating system from damage by incidental contact with environmental objects.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 3 is a side cross sectional, detail view of the invention, taken from the center of FIG. 2, and drawn to enlarged scale.

Similar reference characters denote corresponding features consistently throughout the attached drawings.

DETAILED DESCRIPTION OF THE PREFERRED EMBODIMENTS

Figure 1:
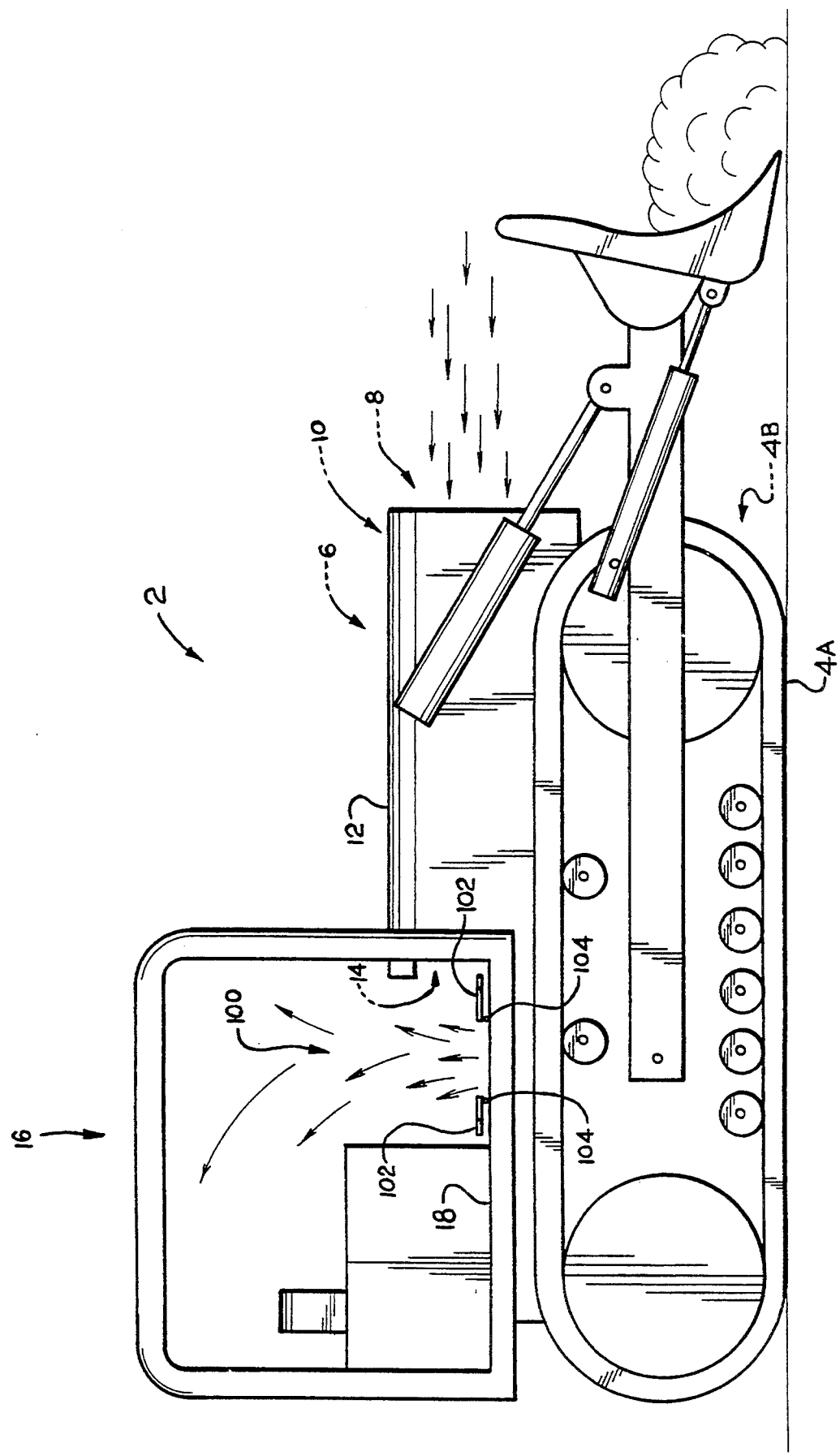
FIG. 1 is an environmental, side elevational view of the invention.

Turning now to FIG. 1 of the drawings, a bulldozer 2 is shown, and is typical of those types of equipment to which the present invention applies. Bulldozer 2 has endless tracks, right side track 4A being visible, and a corresponding left side track 4B concealed in this view. Bulldozer 2 is powered by an engine 6, which is cooled by a conventional radiator 8 and cooling fan 10. An enclosure 12 covers engine 6, and critical envelopment of engine 6 is accomplished in part by a firewall or dashboard 14. Unlike an automobile, wherein there are separate and readily recognizable firewall and dashboard, heavy equipment frequently has a single metal panel serving both functions. Hence, for the purposes of this disclosure, the terms "firewall" and "dashboard" will signify the panel separating the engine compartment from the operator's compartment, and will be employed interchangeably.

Bulldozer 2 also includes an operator's compartment 16, which has a floor 18.

In prior art heavy equipment, fan 10 is usually arranged to discharge air forwardly. In this case, an air current is induced to flow from behind the vehicle, passing between tracks 4A,4B, up into the engine compartment, and through or across radiator 8. The importance of firewall 14 is that it constrains air to flow between tracks 4A,4B, rather than being blown ineffectually past the engine and randomly to the environment.

In all commercially available bulldozers known to the applicant, fan 10 is adjustable or removable or both, and can be arranged to reverse the direction of the air flow scheme described above. When reversed, air flows in the same path, albeit in an opposite direction.

Figure 2:
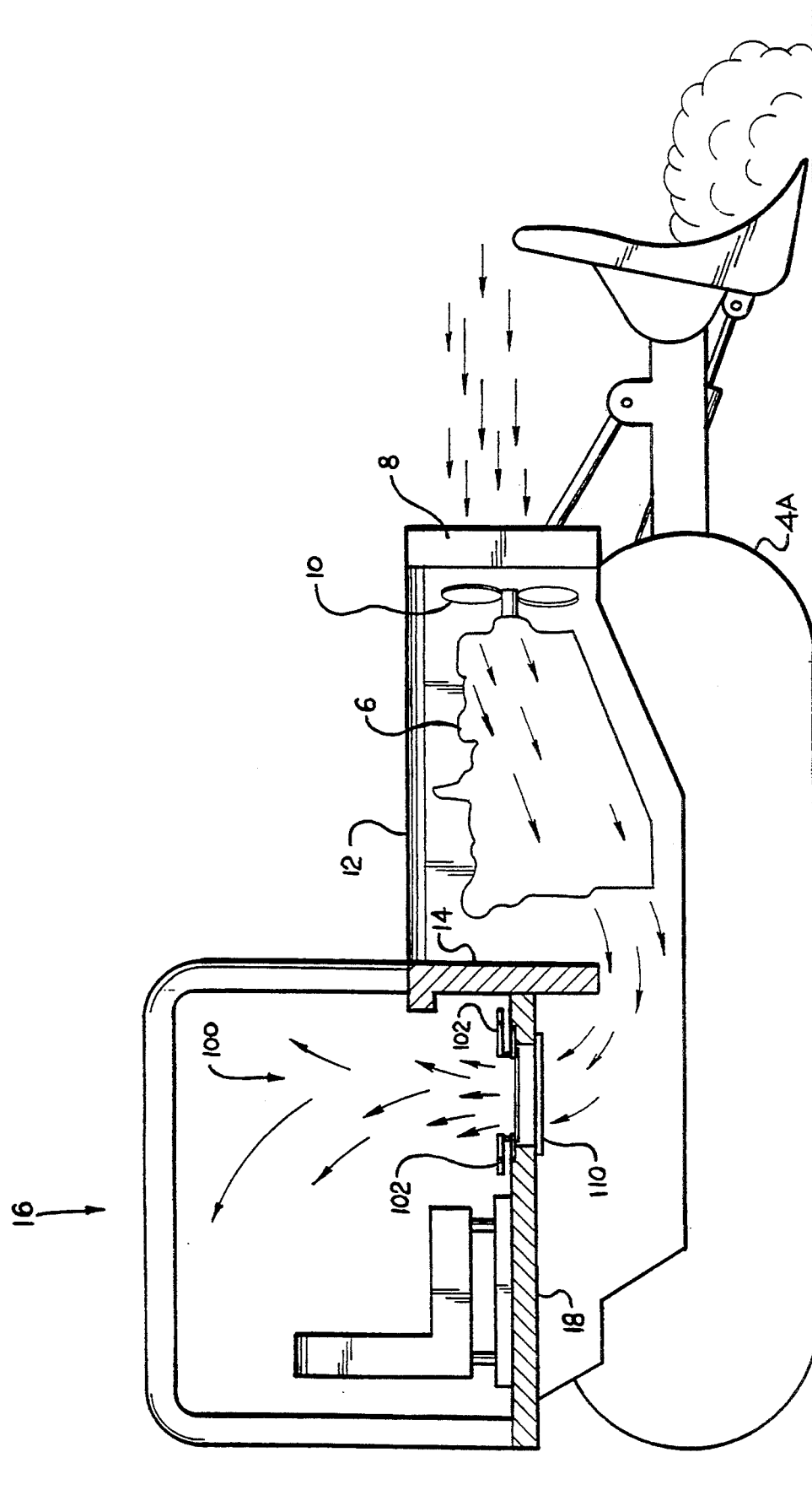
FIG. 2 is an environmental, side cross sectional view of the invention.

To implement the present invention, and referring now to FIG. 2, an opening 100 is cut into floor 18. With fan 10 arranged to blow air from the front of the vehicle to the rear, a significant portion of air flowing between tracks 4A,4B will be discharged upwardly through opening 100, and will warm operator's compartment 16.

In warm weather, fan 10 is arranged to blow air forwardly. Some of the air flowing between tracks 4A,4B is drawn from operator's compartment 16 through opening 100. Thus, a ventilation current is created which mildly cools both the operator and components of operator's compartment 16, which might otherwise become uncomfortably warm during prolonged operation of the vehicle.

Rather than leave opening 100 uncovered, an uncomplicated system of doors 102 is provided, as illustrated in FIG. 3. Doors 102 swing on respective piano hinges 104. When closed, as shown in broken lines in this Figure, doors 102 rest on a supporting surface 106. Surface 106 may be provided by floor 18, if doors 102 are configured to be of greater dimensions than those of opening 100. Alternatively, a separate member (not shown) may be provided to support doors 102 and to limit the swing thereof.

As most heavy equipment has preexisting chassis members 20 and bolts 22 for supporting and securing floor 18 thereto, it is advantageous to employ these structures for anchoring doors 102. This is best accomplished by cutting opening 100 sufficiently large so as to expose chassis members 20. A flange 108 forming part of piano hinge 104 can then be arranged flush to the remaining portion of floor 18, and is bolted to the exposed portion of chassis members 20 by bolts 22.

Piano hinges 104 may be dimensioned and configured to maintain doors 102 at any degree, of opening, so as to control and direct air flowing through opening 100 as desired. Of course, other apparatus well known to those of skill in the art of doors and closures may optionally be furnished to control doors 102.

Preferably, a filter 110 is disposed beneath opening 100, and in underlying relation thereto, so that warmed air flowing into operator's compartment 16 is reasonably free of dust, dirt, and similar contaminants.

The invention disclosed above is implemented in preexisting heavy equipment by cutting out a section of floor 18. The material so removed can be employed in the fabrication of doors 102, if the material is deemed suitable. The advantage of forming doors 102 in this manner is that the piece removed from floor 18 will conform closely to the perimeter of opening 100, and is thus assured of reasonably fitting within opening 100, and of remaining flush with floor 18 when doors 102 are closed. Of course, the removed piece will be cut as necessary to form separate doors 102, where two or more doors 102 are provided.

Alternatively, the modification or improvement described above can be incorporated into the design of new vehicles.

In either case, different specific details of construction and arrangements will occur to those skilled in the appropriate arts.

It is to be understood that the present invention is not limited to the embodiments described above, but encompasses any and all embodiments within the scope of the following claims.

I claim:

1. In a tracked vehicle having endless tracks, an operator's compartment, an engine surrounded by an enclosure, a firewall, an idle space existing behind the engine and between the tracks, an operator's compartment floor, a radiator, and a radiator fan, said enclosure, said firewall, said operator's compartment floor, and said idle space defining a single continuous enclosed space, the improvement comprising:

means defining an opening in the operator's compartment floor, said opening being in direct communication with the enclosed space, whereby air, heated by the radiator and the engine, within said enclosed space is forced through said opening and into the operator's compartment.

2. The improvement according to claim 1, further including removable closure means for selectively covering and exposing said opening.

3. The improvement according to claim 2, wherein said removable closure means comprises at least one member pivotally attached to the tracked vehicle, movable to open and closed positions.

4. The improvement according to claim 2, wherein said removable closure means comprise at least one door mounted on at least one hinge to the tracked vehicle, selectively movable to a closed position, a fully open position, and to any position therebetween, there being a support member disposed below said at least one door, enabling said at least one door to rest thereon when in the closed position.

5. The improvement according to claim 1, further comprising a filter disposed proximate said opening, for filtering air flowing therethrough.

6. In a tracked vehicle having endless tracks, an operator's compartment, an engine surrounded by an enclosure, a firewall, an idle space existing behind the engine and between the tracks, an operator's compartment floor, a radiator, and a radiator fan, said enclosure, said firewall, said operator's compartment floor, and said idle space defining a single continuous enclosed space, the improvement comprising:

means defining an opening in the operator's compartment floor, said opening being in direct communication with the enclosed space, whereby air, heated by the radiator and the engine, within said enclosed space is forced through said opening and into the operator's compartment;

a closure member pivotally attached to the operator's compartment floor at said opening, said closure member selectively movable to a fully open position, a closed position, and to any position therebetween; and a support member disposed below said closure member, enabling said closure member to rest thereon when in the closed position.

* * * * *